Aug. 5, 1924.  1,504,121
R. R. HARRIS
ARTIFICIAL LIMB
Original Filed Sept. 25, 1917  5 Sheets-Sheet 2

Witnesses:

Inventor:
Romaine R. Harris,
Atty.

Aug. 5, 1924.
R. R. HARRIS
ARTIFICIAL LIMB
Original Filed Sept. 25, 1917    5 Sheets-Sheet 3
1,504,121
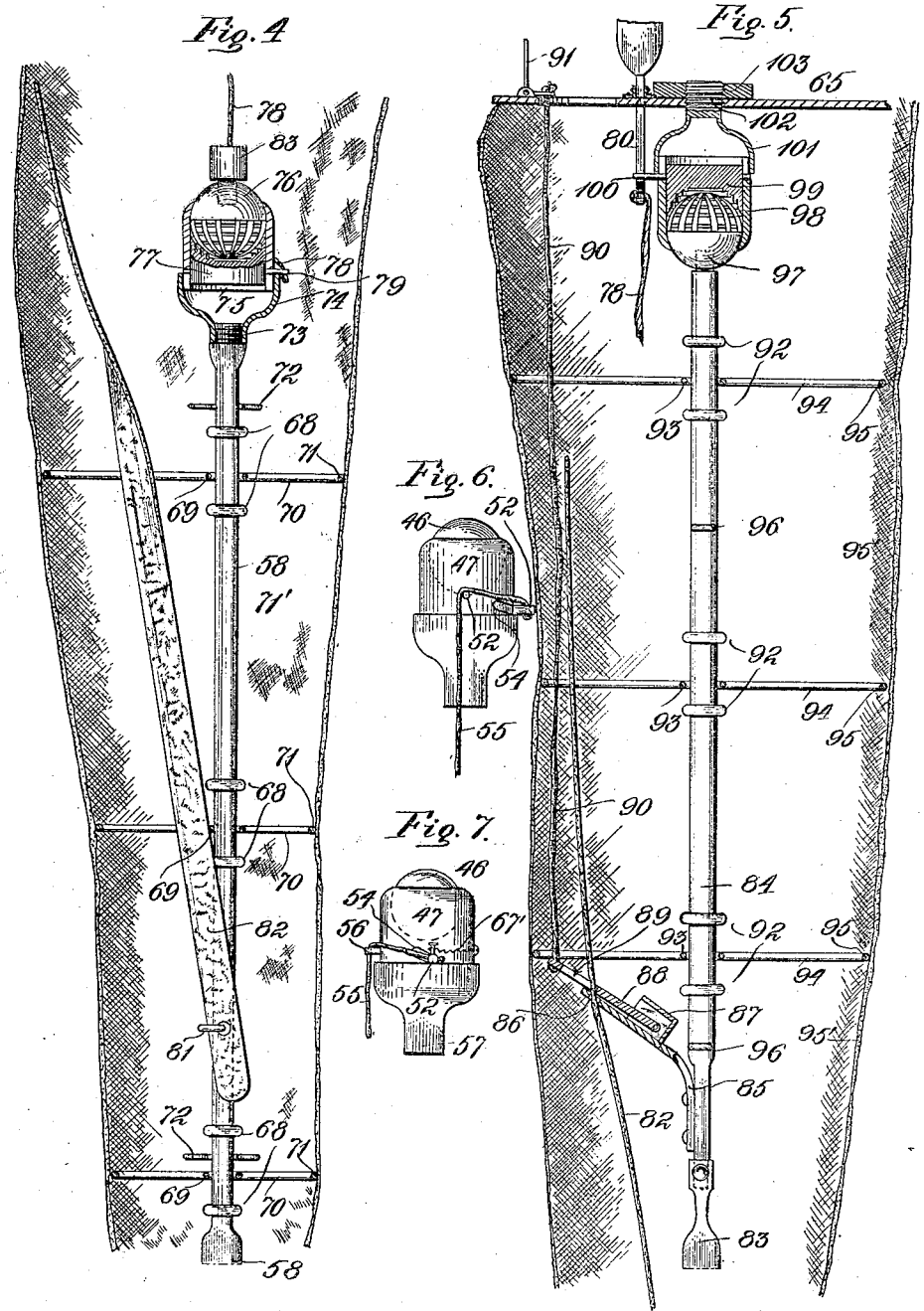

Aug. 5, 1924.  
R. R. HARRIS  
ARTIFICIAL LIMB  
Original Filed Sept. 25, 1917  5 Sheets-Sheet 4

1,504,121

Witnesses:
H. M. Barstow
C. V. Kuster

Inventor:
Romaine R. Harris,

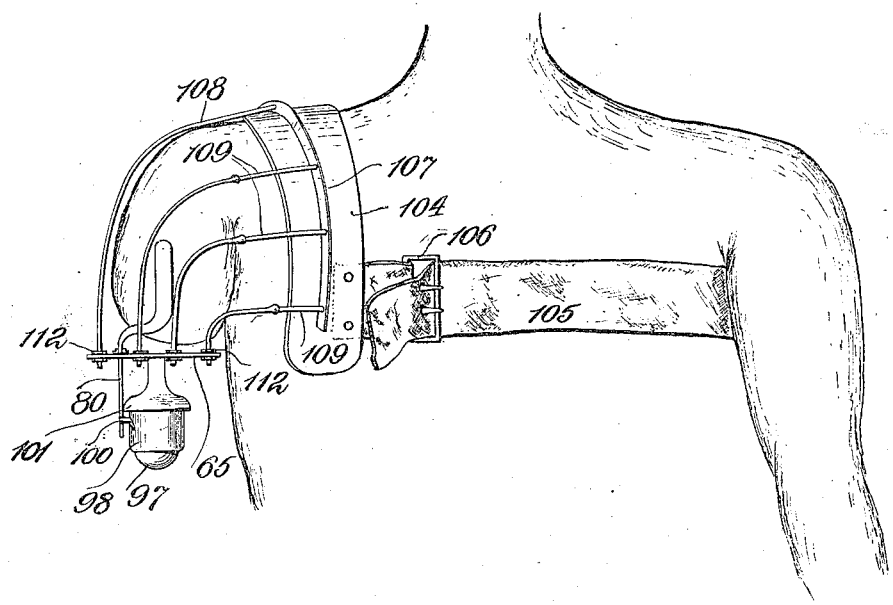

Patented Aug. 5, 1924.

1,504,121

UNITED STATES PATENT OFFICE.

ROMAINE R. HARRIS, OF LOS ANGELES, CALIFORNIA, ASSIGNOR, BY DIRECT AND MESNE ASSIGNMENTS, TO NATURAL FUNCTION LIMBS COMPANY, A CORPORATION.

ARTIFICIAL LIMB.

Application filed September 25, 1917, Serial No. 193,196. Renewed December 18, 1922.

*To all whom it may concern:*

Be it known that I, ROMAINE R. HARRIS, a citizen of the United States, residing at Los Angeles, county of Los Angeles and State of California, have invented a certain new and useful Artificial Limb, of which the following is a specification.

My invention relates to artificial limbs, including the arm and hand, and has for its object to produce a substantial, light and inexpensive substitute for the natural hand and arm, in which all of the natural movements of the human limb may be simulated, in which perfect ventilation and comfort may be afforded the wearer, and which may be adapted for use as a right or left member.

My invention comprises a shoulder section, an arm section consisting of the humerus and radius, and a hand section comprising the palm and phalanges; all operable and controllable, as hereafter pointed out, by the stump and shoulders, to produce the movements peculiar to the natural hand and arm.

Heretofore artificial arms have comprised a wooden shell or other rigid enclosure, in which was contained the operating mechanism.

These limbs are heavy and awkward and restricted in movement, in addition to allowing of no freedom of movement akin to the natural arm, and hence produce discomfort and are a noticeable burden to the user.

The present invention comprises a combination of simple elements, independently and simultaneously co-operating to effect flexibility of the joints and a wide range of movements including that of elevating the arm and hand above the head without interfering with the successful operation of the phalanges of the hand.

Other objects will appear from the subjoined specification in connection with the accompanying drawings, in which Fig. 1 is a plan view of the hand.

Fig. 4 is an elevation of the radius portion of the arm.

Fig. 5 is an elevation of the humerus portion.

Fig. 6 is a detail of a ball and socket arrangement used as joints in my invention.

Fig. 7 is a detail of a ball and socket joint showing the bayonet locking means, the operating cord, and the spring to hold the locking means in inoperative position.

Fig. 10 is a view showing the cage attached to the body of a person.

As will appear hereinafter, the humerus section, radius section and portion of the hand are represented by a jointed element, operable similarly to the natural members, and encased by a light covering, representative of the natural flesh portion, and with respect to which covering the jointed element is freely and independently movable. In the following descriptive treatise of the various parts and their relation, each will be detailed under a separate heading.

The hand and wrist.

Figure 1:
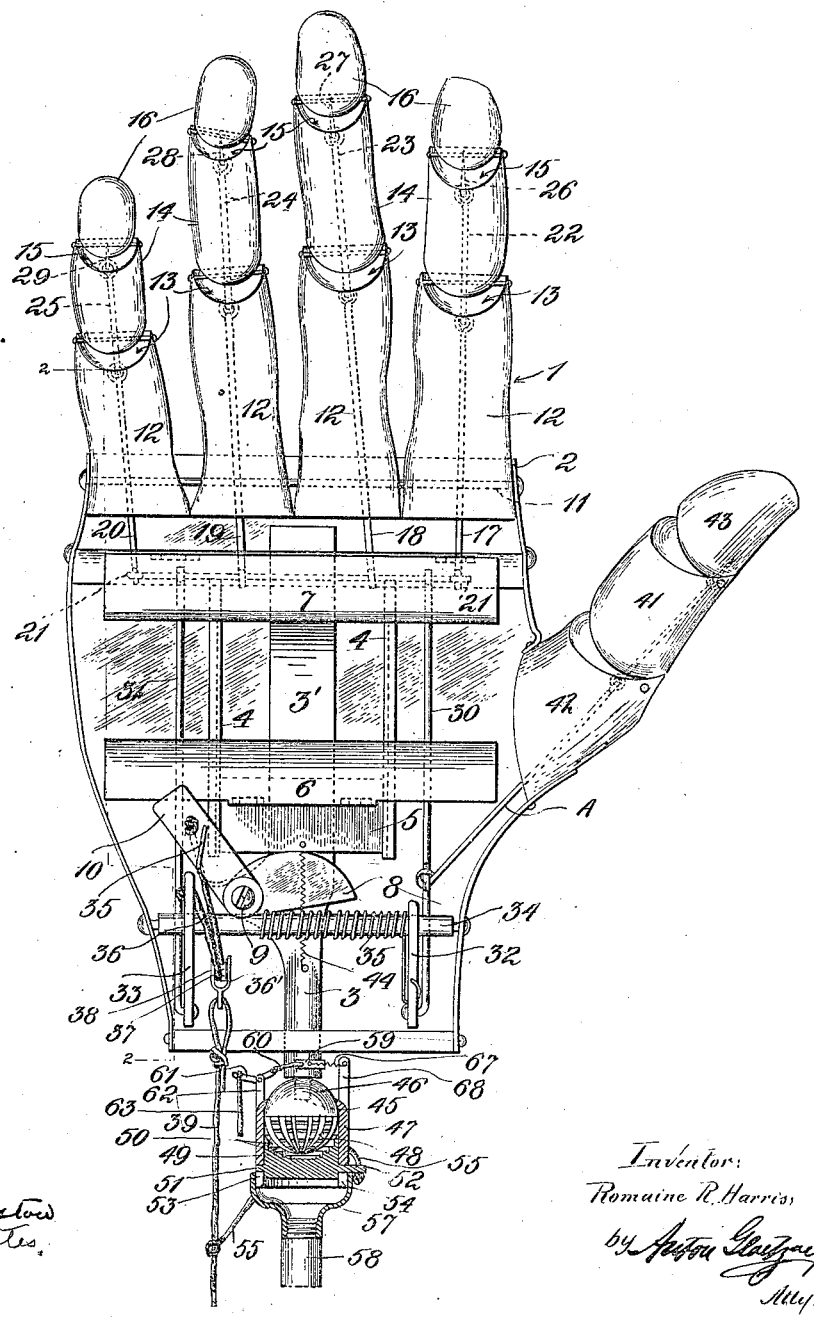
Figure 2:
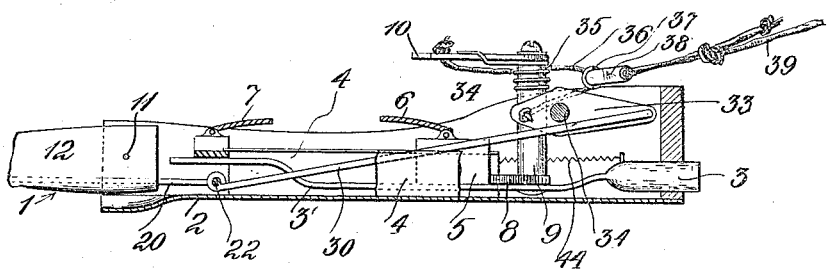
Fig. 2 is a longitudinal section through approximately the center of the hand shown in Fig. 1.

Fig. 1 illustrates a form of hand and wrist construction embodying the principles of my invention.

The fingers 1 are pivoted in the forward end of a suitable support 2, which may represent the general structure and contour of a hand, and which is preferably attached in rigid fashion to the flattened portion 3' of a bar 3. On said bar 3, and in guideways 4, laterally disposed of the bar, is a slide 5, upon which is hingedly mounted a jaw 6, arranged for co-operation with a stationary jaw 7, hingedly mounted on said bar, in gripping an object in manner similar to the prehensile function of the natural palm. This slide 5 is operable by a cam 8, on a post 9, carried by said bar 3, and given a revolutionary movement by an arm 10, which, when pulled, as hereinafter explained, causes the cam 8, to operate the slide and move the jaw 6 toward the stationary jaw 7. Ordinarily the jaws lie practically in a horizontal plane, (assuming the position of the hand to be horizontal), but when gripping an object, rise to the limit of movement of the hinges. Such operation of the movable jaw 6 occurs simultaneously with the operation of the fingers, but may also occur independently of the operation of the fingers, as may the fingers be operated also independently of or simultaneously with the operation of the jaw, as hereinafter shown.

Figure 3:
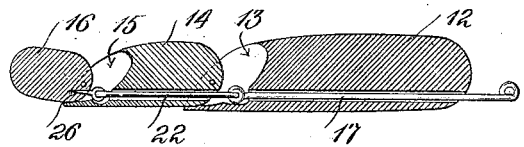
Fig. 3 is a section of one of the fingers.
Figure 8:
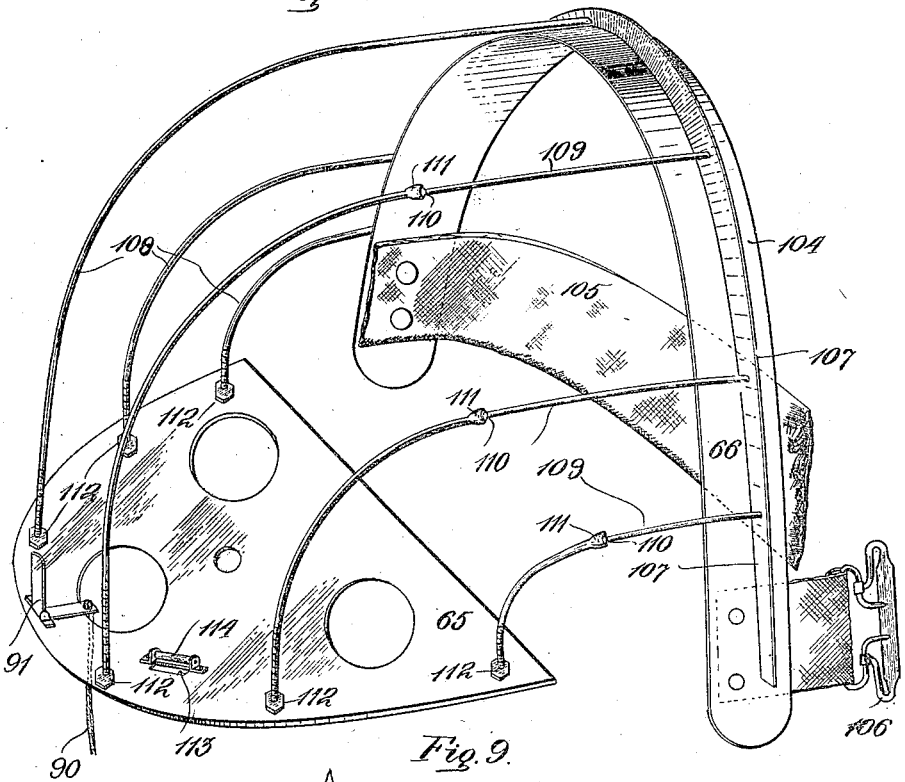
Fig. 8 is a perspective view of the shoulder attachment and cage.

The fingers 1 are pivotally mounted on a rod 11, which extends approximately through the center of the first phalanges 12 of each finger. These first phalanges 12, are socketed, as at 13, to accommodate the second phalanges 13, which are pivotally fastened to the first phalanges, and the second phalanges 14 are socketed, as at 15, to accommodate the third phalanges 16, which are pivotally attached to the second phalanges. In and below the central plane of each phalanges 12, is a bore or passageway, as shown in Fig. 3, in each of which is positioned a rod 17, 18, 19, and 20, connected to a main cross bar 21. To each end of said rods 17, 18, 19 and 20 is loosely attached an operating rod 22, 23, 24 and 25, extending freely through a bore in and below the pivotal connection of each of the second phalanges 14; and to the respective ends of the rod 22, 23, 24 and 25, are loosely connected acuminate studs 26, 27, 28 and 29, which penetrate into the third phalanges 16, below the pivotal center thereof.

As will be seen from Fig. 1, the location of the joints of the various rods with relation to the different phalanges is such that the third or terminal phalanges 16, is first operated, and then the second in immediate succession. The first phalanges 12 are operated by rods 30 and 31, pivotally carried in levers 32 and 33, on a shaft 34, about which is coiled a spring 35, that holds the finger phalanges in normally open position. This spring is also coiled about the post 9, and terminates in engagement with the arm 10, whereby the cam 8 on the post is held in inoperative position.

Obviously the movement of the rods 30 and 31 is communicated to the finger phalanges.

On the end of the arm 10, and onto the end of the lever 33, is fastened a cord, cable or other flexible strand 36, the loop 36' resulting from such fastening of the ends of the flexible strand, being engaged by a sheave 37, in a block 38.

Figure 9:
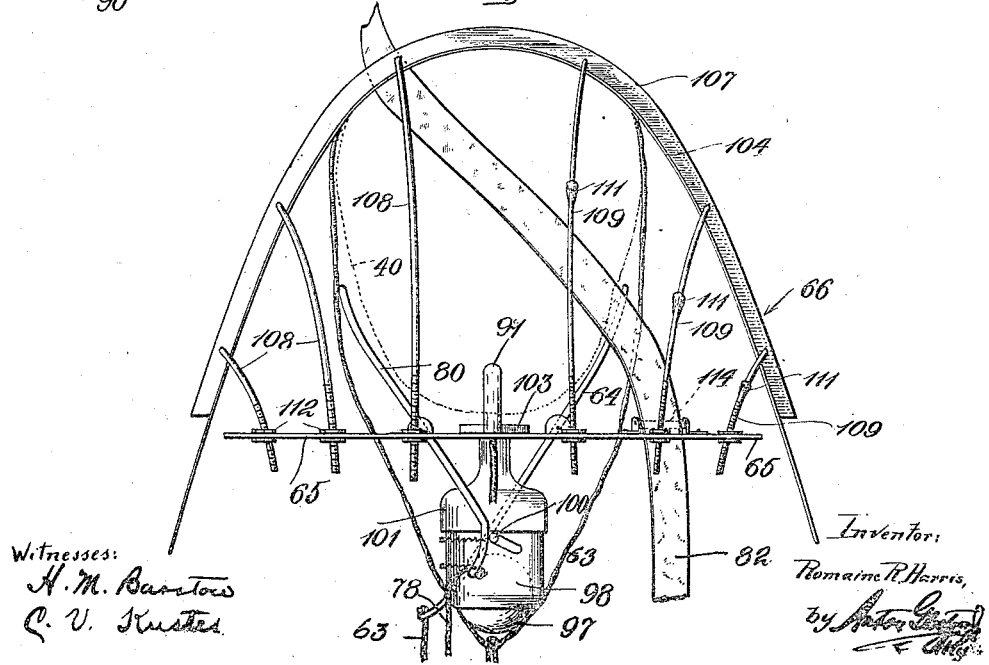
Fig. 9 is a front view of the shoulder attachment and cage.

When such block is drawn, as by a cord 39, looped over the shoulder 40, of the stump or maimed member, as seen in Fig. 9, the arm 10 will first be operated, it transferring its rotatory motion to the cam 8, by which the movable jaw is slid along the guideways toward the stationary jaw. When the jaw 6 has been moved to its farthermost position, the continued pull on the flexible strand 36, will operate the levers 32 and 33, which thereupon force the rods 30 and 31 and the transversely connected cross bar 21, forwardly, and producing by such forward motion sequentially the operation of the third, second and first phalanges. Upon releasing the flexible strand 36 from tension, the parts all assume their normal positions under the influence of the spring 35.

The first phalange 41, of the thumb is pivotally joined to a metacarpal section 42, while the second phalange 43 is pivotally fastened to the first phalange 41, the operating means for the thumb, consisting of the connected units A, being pivotally attached to the rod 30, 31, wherethrough such units are moved simultaneously with the movement of the various phalanges of the fingers.

As will be plainly apparent from the showing, the mounting of the fingers and thumb, is such that they may be readily and quickly transposed, and such capability renders easy their adaptation for either the right or the left hand, an advantage wholly eliminating the necessity, at present unavoidable, of making up separately all parts for the arms. The removal of the rod 11, and a few other obvious changes of minor importance enables this transposition of the fingers and thumb without difficulty or the exercise of skill.

The slide 5 is held in contact with the cam 8 by a spring 44.

*The wrist joint.*

The bar 3 is provided with a reduced threaded portion 45, for engagement by a ball 46, housed in a socket 47, and grooved radially and horizontally, as at 48. Below said ball 46, is a locking means 49, which may consist of a dished disk having a plurality of concentric steps 50, arranged for engagement with the grooves 48 in said ball and holding the hand in any position to which it may be adjusted by the means presently described.

This dished disk 49, is provided with oppositely disposed pins 51 and 52, the latter being longer than the former and both operating in inclined ways 53 and 54, respectively, on opposite sides of the socket 47, to move the disk into locking or unlocking position. Onto the longer pin 52, is attached an operating cord 55, which runs over a stud 56, on the socket 47 and then connects with the main operating cord or flexible device 39, whereby the locking of the hand occurs simultaneously or slightly in advance of the operation of the fingers.

The socket 47, is tightly fitted into a shell 57, which holds the projecting pin 52 of the locking means in position, and which is threaded to receive the threaded end of the radius 58.

On the bar 3 is secured a curved member 59, connected by a flexible strand 60 to one end of a bell crank 61, pivoted in a post 62, on said socket 47, a cord or cable 63 being fastened to the other end of said bell crank 61 and serving to move the hand to any desired position. This cord 63, is connected to and controllable by the movement of a paddle 64, pivotally mounted in the floor 65 of a shoulder cage 66, and arranged in the path of movement in one direction of the stump.

The return of the hand to normal position is accomplished by a spring 67, connected to the member 59, and an extension 68 on said housing 47.

Figs. 6 and 7 illustrate different views of the balls and sockets, and throughout the specification and wherever they are duplicated as parts of the invention, they will be referred to only generally, the foregoing detailed description of one such universal joint sufficing for all.

When the tension on the cords connected to the longer of the pins 52, of the locking means, is released, the locking means returns to normal position automatically under the influence of a spring 67', shown in Fig. 7.

The radius.

The radius comprises a bar 58, provided with a plurality of series of annular abutments 68, severally consisting of two and between each series and loosely encircling said bar is a ring 69 connected by radial spokes 70 to an outer ring 71, whereon is fitted a covering 71' of light material representing the fleshy part of the arm. The bar 58 is slidable in and relatively to the rings 71 thereon, and hence the covering will retain its form and remain in set position during any of the numerous movements of the arm. Eyelets 72 may be provided on the bar 58, for threading the various cords or tables and preventing entanglement within the covering.

The radius bar 58 is provided with threads 73, arranged for engagement by a cap 74, fitting snugly over a socket 75, carrying a ball 76, lock 77, and other parts as hereinbefore described, the lock 77 being operated by a cord 78, attached to the longer pin 79 and to one end of a paddle 80, pivotally mounted in the floor 65, of the shoulder cage 66, and arranged in the path of movement in another direction of the stump.

On the bar 58 is a hook 81, onto which is attached a band or strip 82 of flexible material, as canvas or leather, which is adapted to be extended preferably about the arm opposite the maimed one, or in any other manner, for lifting the forearm.

Screwed into or otherwise secured to the ball 76, is a short joint 83, that is pivotally attached to one end of a bar 84, representing the humerus. Such pivotal connection at the elbow permits of full movement of the forearm relatively to the humerus, while the ball 76 and socket 75, provides for a universal movement in any direction, simultaneously with or independently of the pivotal connection.

The humerus.

On the bar 84, is riveted a strip 85 of metal, bent upon itself at substantially right angles and provided near the end thereof with a slot 86, through which the band or leather strip 82, aforementioned, is arranged to pass. On the upper side of said strip 85, is a boxing 87, in which is pivotally mounted a lock bar 88, having an opening 89 near the end thereof, the inner edge of the opening being on or nearly on a line with the outer edge of the slot 86. The band 82 passes through the opening 89, in, and is arranged to be wedged and held by, said lock bar 88, when weight or pull is exerted on the strip 82.

The lock bar 88 is removed from engaging contact with the band 82 by a cord 90 operated by a bell crank lever or paddle 91, pivoted on the floor 65 of the shoulder cage 66, and controllable by the movement of the stump in still another direction.

A plurality of series of abutments 92, severally consisting of two, is formed on said bar 84, and between each series and loosely encircling said bar is a ring 93, connected by radial spokes 94 to an outer ring 95, supporting a covering of light material 95', representing the fleshy part of the arm. Eyelets 96 may be provided on the bar 84, for threading the various cords or cables.

The upper end of the bar 84 is threaded for engagement by a ball 97, in a socket 98, carrying a disk lock 99, provided with a pin 100, arranged for engagement by the paddle 80 in operating the lock 99. Onto the socket 98 is fitted a cap 101 having an externally threaded portion 102 extending through the floor 65 of the cage 66, and engaged by a lock nut 103.

The cage.

The co-operating parts of the arm and hand, as hereinbefore described, are supported from a cage 66, consisting of an arcuate shoulder rest 104, adapted to be appended to the shoulder by a strap 105, encircling the upper part of the body. This strap is riveted to one end of the rest, and temporarily fastened at its free end by a buckle 106.

The arcuate rest 104 is provided with a central flange 107, through which a plurality of curved rods 108 may operate and onto which a plurality of curved rods 109 may be fixedly secured. These last named rods 109 are preferably flexibly joined to have movement relatively to the shoulder rest, and for that purpose may be comprised of two parts connected intermediate their lengths by balls and sockets 110 and 111. To the ends of these rods 108 and 109, which are threaded, is adjustably secured by nuts 112, a floor 65, in which the various operating devices for controlling the cords, as herein already detailed, are mounted.

When the shoulder rest is firmly attached to the shoulder, it is capable of no other movement than that given by the movement of the shoulder. The floor, however, and the connecting rods 108 and 109, may move relatively to the rest and with the stump, thus doing away with a rigid, immovable enclosure for the maimed member, thus affording comfort, ease and flexibility to the wearer, in addition to perfect ventilation.

The leather band 82, referred to, extends through a slot 113 in said floor 65 and operates over a roller 114.

The covering 95' for the humerus is fastened in any convenient manner to the floor 65, and it will be apparent that no mechanism, weight or strain is carried by the arm coverings, and that the radius and humerus are independently movable relatively to the coverings.

It will be obvious from the foregoing, that all of the co-operating units of the assembled artificial limb may be so controlled by the wearer that perfect relaxation of them is at all times possible where not used, and in respect of the use of the radius and humerus as foundation units for an artificial arm, this invention is new and novel.

What I claim, is:—

1. An artificial limb comprising a shoulder rest, having a floor connected therewith and arranged for accommodation of the stump, a humerus member flexibly carried by said floor, a radius member flexibly connected to said humerus member, a hand section flexibly connected to said radius member, a locking means for each of the flexible connections, a means for moving the hand section, means on the floor of the shoulder rest and controllable by the movement of the stump for operating said hand section, moving means and locking means, means controllable by the shoulder movement for moving the radius member, and a covering for the radius and humerus member.

2. An artificial limb comprising a shoulder rest adapted for attachment to the upper part of the body, a plurality of curved rods on said rest, part of which are movable relatively to said rest and part of which are flexibly joined intermediate their lengths, a floor adjustably secured to said rods, a humerus member carried by said floor, a radius member flexibly connected to said humerus bar, and a hand section flexibly connected to said radius member, with means controllable by the stump and both shoulders for giving movement to the hand, radius and humerus member.

3. An artificial arm comprising a cage, consisting of a vertical shoulder rest, a horizontal floor, and a plurality of curved rods joining the shoulder rest and floor, several of said rods being capable of movement relatively to said rest, and several being flexibly joined intermediate their lengths, an arm member flexibly carried by said floor, and a hand section flexibly joined to said arm member.

4. An artificial limb comprising a humerus and radius member, a shoulder rest carrying the humerus, a hand section, consisting of a bar universally joined to said radius member, a form on said bar, a plurality of fingers pivotally mounted on said form and severally consisting of a plurality of phalanges pivotally joined, a plurality of relatively movable means extending through and below the pivots of each of said phalanges, and means to operate said relatively movable means to close the phalanges.

5. An artificial limb comprising a humerus and radius member, a shoulder rest for the humerus member and a hand section, said hand section consisting of a bar universally joined to said radius member, a hand form on said bar, a plurality of fingers pivotally mounted on said form and severally consisting of a plurality of phalanges pivotally joined, a plurality of interconnected and relatively movable means extending through and below the pivots of each of said phalanges, means to operate said phalanges, a stationary and a movable jaw on said bar, and means to operate said movable jaw.

6. An artificial limb comprising a hand section consisting of a plurality of phalanges, a hand form in which the phalanges are pivoted, means movable relatively to said phalanges to operate same, mechanism for operating said movable means, means to hold said phalanges in normally open and loose position, a plurality of jaws mounted on said hand section and extending transversely thereof, and means to move one of said jaws relatively to the other.

7. An artificial limb comprising a plurality of fingers, severally comprising a plurality of phalanges pivotally joined, a pivotal support for the first of said phalanges, a plurality of jaws on said support, and means for moving said phalanges simultaneously or independently of one of the said jaws.

8. An artificial hand comprising a plurality of fingers severally comprising a plurality of phalanges pivotally joined, a pivotal support for the first of said phalanges, means to hold said phalanges in normally open position, a plurality of hinged jaws, operating means for one of said jaws, and a single means for simultaneously and independently controlling the operating means for the phalanges and jaw.

9. An artificial limb comprising a shoulder rest, a humerus section universally joined to said rest, a control for said universal joint, a radius section pivotally joined to said humerus section, an operating means for said radius section, a hand section carried by said radius section and movable relatively thereto, means controllable by the movement of the stump to move said hand section, means to lock said hand section in moved position, means controllable by a movement of the stump for operating said lock, a plurality of finger joints on the hand section, means to operate the fingers, and means controllable by the movement of the shoulder for operating the finger operating means.

10. An artificial limb comprising a hand section consisting of a hand form, a plurality of phalanges pivoted in said form and pivotally joined, means extending loosely through said phalanges to operate same, a rod on which all of said phalanges are pivoted, a plurality of jaws in said hand form, and a single means to operate one of said jaws relatively to the other, and to operate said phalanges.

11. An artificial limb comprising a flexibly jointed member representing the bony structure of the natural arm, a hand section joined to said member, a shoulder support for said member, and a covering loosely supported and carried by said member, said member being capable of rotary movement relatively to said covering.

12. An artificial limb consisting of a flexibly jointed member representing the bony structure of the natural arm, and including an upper arm section and a lower arm section, a hand section joined to said member, means to make all the jointed sections relatively rigid, and means to operate the jointed units simultaneously or independently.

13. An artificial limb consisting of a central bar, a plurality of cover supporting members arranged on said bar and loosely engaging the same, and a cover secured to said members, said bar being rotatable relative to said cover.

14. An artificial limb consisting of a central bar, a plurality of cover supporting members arranged on said bar, each of said members comprising an inner and an outer ring connected by spokes, the inner rings of said members loosely engaging said bar, and a covering secured to the outer rings.

15. In an artificial arm, a cage, a bar supported therefrom, and comprising two portions pivotally connected, a cord attached to the lower portion of said bar for moving the same relative to the upper portion, said cord extending upwardly to said cage, means on the upper portion of the bar for locking said cord against movement, and means operable from the cage for releasing said locking means.

16. An artificial arm comprising a cage, a humerus section, a radius section and a hand section, said parts being connected to each other in turn by ball and socket joints, and means operable from the cage for locking each of said joints against movement.

17. In an artificial arm, a cage, a jointed bar supported therefrom, and representing the humerus and radius portions of the arm, a hand member, a plurality of phalanges connected thereto, a ball and socket connection between said bar and hand member, means operable from the cage for rotating the hand member relative to said bar, and other means also operable from the cage for moving said phalanges and for locking said hand member against movement.

18. In an artificial limb, a hand having a series of phalanges pivotally attached thereto, a fixed and movable jaw arranged in the palm of the hand, means for operating said phalanges including a lever, means for operating said movable jaw also including a lever, a flexible cord connected at its ends to said levers, a second cord slidably connected to the intermediate portion of said first named cord, and means for operating said last named cord.

19. In an artificial limb, a hand member having a plurality of phalanges pivotally connected thereto, a fixed and movable jaw on said hand member, and means for moving said movable jaw and said phalanges.

20. An artificial arm comprising a cage adapted to be supported on the shoulder of the wearer, a jointed arm member supported from said cage, a plurality of paddles mounted on said cage in position to be operated by the stump of an arm, and a plurality of cables connected to said paddles and to parts of said jointed arm member for operating the same.

21. An artificial arm comprising a cage adapted to be supported on the shoulder of the wearer, a jointed arm member supported from said cage, locking means between parts of said jointed arm member, a plurality of paddles mounted on said cage, and cables connected to said paddles and to said locking means for controlling the latter.

22. An artificial arm comprising a cage adapted to be supported on the shoulder of the wearer, a jointed arm member supported from the cage and including an upper arm section and a lower arm section, a flexible member connected to said last named section and extending upwardly to said cage, whereby said lower section may be moved relative to the upper section, locking means between said sections, a paddle supported on said cage in position to be moved by the stump of an arm, and means operated by movement of said cable for controlling said locking means.

23. An artificial arm comprising a cage adapted to be supported on the shoulder of the wearer, a jointed arm member connected to said cage, said member including a hand section rotatable about its longitudinal axis and having a plurality of pivotally connected finger elements, a flexible member connected to said hand section for simultaneously moving said finger elements to close the hand, said flexible member extending upwardly to said cage, a second flexible member extending from said hand section to said cage for rotating said hand section, and a paddle on said cage to which said last named flexible member is connected.

24. In an artificial arm, a cage having a substantially horizontal floor, a jointed arm member supported from said floor, paddles pivotally mounted on said floor and cables extending downwardly therefrom and connected to parts of said jointed arm member for operating the same.

In testimony whereof I have set my hand in the presence of two witnesses.

ROMAINE R. HARRIS.

Witnesses:
 HENRY E. STORRS,
 ANTON GLOETZNER, Jr.